US007735138B2

(12) United States Patent
Zhao

(10) Patent No.: US 7,735,138 B2
(45) Date of Patent: Jun. 8, 2010

(54) METHOD AND APPARATUS FOR PERFORMING ANTIVIRUS TASKS IN A MOBILE WIRELESS DEVICE

(75) Inventor: Xiaoming Zhao, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 1429 days.

(21) Appl. No.: 11/126,476

(22) Filed: May 10, 2005

(65) Prior Publication Data
US 2006/0161985 A1   Jul. 20, 2006

Related U.S. Application Data

(60) Provisional application No. 60/643,908, filed on Jan. 14, 2005.

(51) Int. Cl.
*H04L 29/06* (2006.01)
*G06F 21/00* (2006.01)

(52) U.S. Cl. .................... 726/24; 713/164; 713/188

(58) Field of Classification Search ............. 726/22–24; 713/187, 188
See application file for complete search history.

(56) References Cited

U.S. PATENT DOCUMENTS

| 6,327,579 | B1 | 12/2001 | Crawford | |
|---|---|---|---|---|
| 2002/0042886 | A1 | 4/2002 | Lahti et al. | |
| 2002/0178375 | A1* | 11/2002 | Whittaker et al. | 713/200 |
| 2002/0178381 | A1 | 11/2002 | Lee et al. | |
| 2003/0079145 | A1* | 4/2003 | Kouznetsov et al. | 713/200 |
| 2003/0177397 | A1 | 9/2003 | Samman | |
| 2003/0182431 | A1* | 9/2003 | Sturniolo et al. | 709/227 |
| 2004/0054911 | A1 | 3/2004 | Chennakeshu et al. | |
| 2004/0083384 | A1 | 4/2004 | Hypponen | |
| 2004/0158741 | A1 | 8/2004 | Schneider | |
| 2004/0237079 | A1 | 11/2004 | Cox et al. | |

(Continued)

FOREIGN PATENT DOCUMENTS

EP      1 316 873 A2      6/2003

(Continued)

OTHER PUBLICATIONS

API Spying Techniques for Windows 9x, NT and 2000; pp. 1-9; Copyright 1999, 2000 Yariv Kaplan; [retrieved on Feb. 23, 2005]; Retrieved from the internet: <URL:http://www.internals.com/articles/apispy/apispy.html>.

(Continued)

*Primary Examiner*—Gilberto Barron, Jr.
*Assistant Examiner*—Abdulhakim Nobahar
(74) *Attorney, Agent, or Firm*—Okamoto & Benedicto LLP

(57) ABSTRACT

Disclosed are techniques for performing an antivirus task in a mobile wireless device running an embedded operating system. In one embodiment, calls intended for an application programming interface (API) function code is redirected to an antivirus function code. The redirection to the antivirus function code may be performed by modifying a kernel structure to point to a modified entry list instead of an API entry list. The redirection to the antivirus function code may also be performed by modifying the API function code to allow the antivirus function code to execute before the API function code. The kernel structure or the API function code may be properly restored back to its original form. Software implementations of these techniques may be readily loaded and unloaded, and may not require re-installation of the embedded operating system.

11 Claims, 6 Drawing Sheets

U.S. PATENT DOCUMENTS

2005/0033975 A1* 2/2005 Lahti et al. .................. 713/200
2005/0229250 A1* 10/2005 Ring et al. .................... 726/23

FOREIGN PATENT DOCUMENTS

| EP | 1 316 873 A3 | 12/2004 |
| WO | WO 03/017068 A2 | 2/2003 |
| WO | WO 03/017068 A3 | 2/2003 |

OTHER PUBLICATIONS

Webopedia; What is Kernel?—A word definition from the Webopedia Computer Dictionary; pp. 1-3; Copyright 2004, Jupitermedia Corporation; [retrieved on Apr. 15, 2005]; Retrieved from the internet: <URL:http://www.webopedia.com/TERM/k/kernel.html>.

Real-Time operating system—Wikipedia, the free encyclopedia; pp. 1-4; [retrieved on Apr. 18, 2005]; Retrieved from the Internet: <URL:http//en.wikipedia.org/wiki/Real-time_operating_system.html>.

Seung-Woo Kim, "Intercepting System API Calls" May 13, 2004, pp. 1-5, [retrieved on Apr. 19, 2005], Intel Software Forums, <URL: http://softwareforums.intel.com/ids.html>.

POSIX Threads Programming; Jan. 31, 2003; pp. 1-38; [retrieved on Apr. 15, 2005]; Retrieved from the Internet: URL: http://www.llnl.gov/computing/tutorials/workshops/workshop/pthreads/MAIN.html>.

McAfee Netshield for Netware, Jul. 31, 2000, pp. 70-71, XP-002241250.

PCT International Search Report for International Application No. PCT/JP2006/300567 (4 sheets). Jun. 2006.

* cited by examiner

METHOD AND APPARATUS FOR PERFORMING ANTIVIRUS TASKS IN A MOBILE WIRELESS DEVICE

CROSS-REFERENCE TO RELATED APPLICATION

This application claims the benefit of U.S. Provisional Application No. 60/643,908, filed on Jan. 14, 2005, which is incorporated herein by reference in its entirety.

BACKGROUND OF THE INVENTION

1. Field of the Invention

The present invention relates generally to antivirus systems, and more particularly but not exclusively to methods and apparatus for performing antivirus tasks in mobile wireless devices.

2. Description of the Background Art

Mobile wireless devices become more sophisticated with advances in technology. For example, some mobile telephones, referred to as "smart phones," now have processing and data storage resources to accommodate photos, videos, music, calendars, and other functions previously performed by general-purpose computers. Some smart phones also have the capability to exchange data with general-purpose computers and other telephones. Although connectivity with other devices has obvious benefits, it also brings with it security problems, such as exposure to computer viruses.

Computer viruses, worms, Trojans, and spyware are examples of malicious codes that have plagued computer systems throughout the world. Although there are technical differences between each type of malicious code, malicious codes are commonly collectively referred to as "viruses." For example, commercially available "antivirus software" is designed to scan a computer for viruses as well as worms and other malicious codes. While effective antivirus software is generally available for general purpose computers, this is not the case for smart phones. The somewhat limited computing resources of smart phones are optimized to handle telephone communications. Accordingly, smart phones run embedded operating systems, such as the Microsoft Windows Mobile™ platform. Unfortunately, conventional techniques for performing antivirus tasks in general purpose computers cannot be effectively used in smart phones running embedded operating systems.

SUMMARY

Disclosed are techniques for performing an antivirus task in a mobile wireless device running an embedded operating system. In one embodiment, calls intended for an application programming interface (API) function code is redirected to an antivirus function code. The redirection to the antivirus function code may be performed by modifying a kernel structure to point to a modified entry list instead of an API entry list. The redirection to the antivirus function code may also be performed by modifying the API function code to allow the antivirus function code to execute before the API function code. The kernel structure or the API function code may be properly restored back to its original form. Software implementations of these techniques may be readily loaded and unloaded, and may not require re-installation of the embedded operating system.

These and other features of the present invention will be readily apparent to persons of ordinary skill in the art upon reading the entirety of this disclosure, which includes the accompanying drawings and claims.

Figure 1:
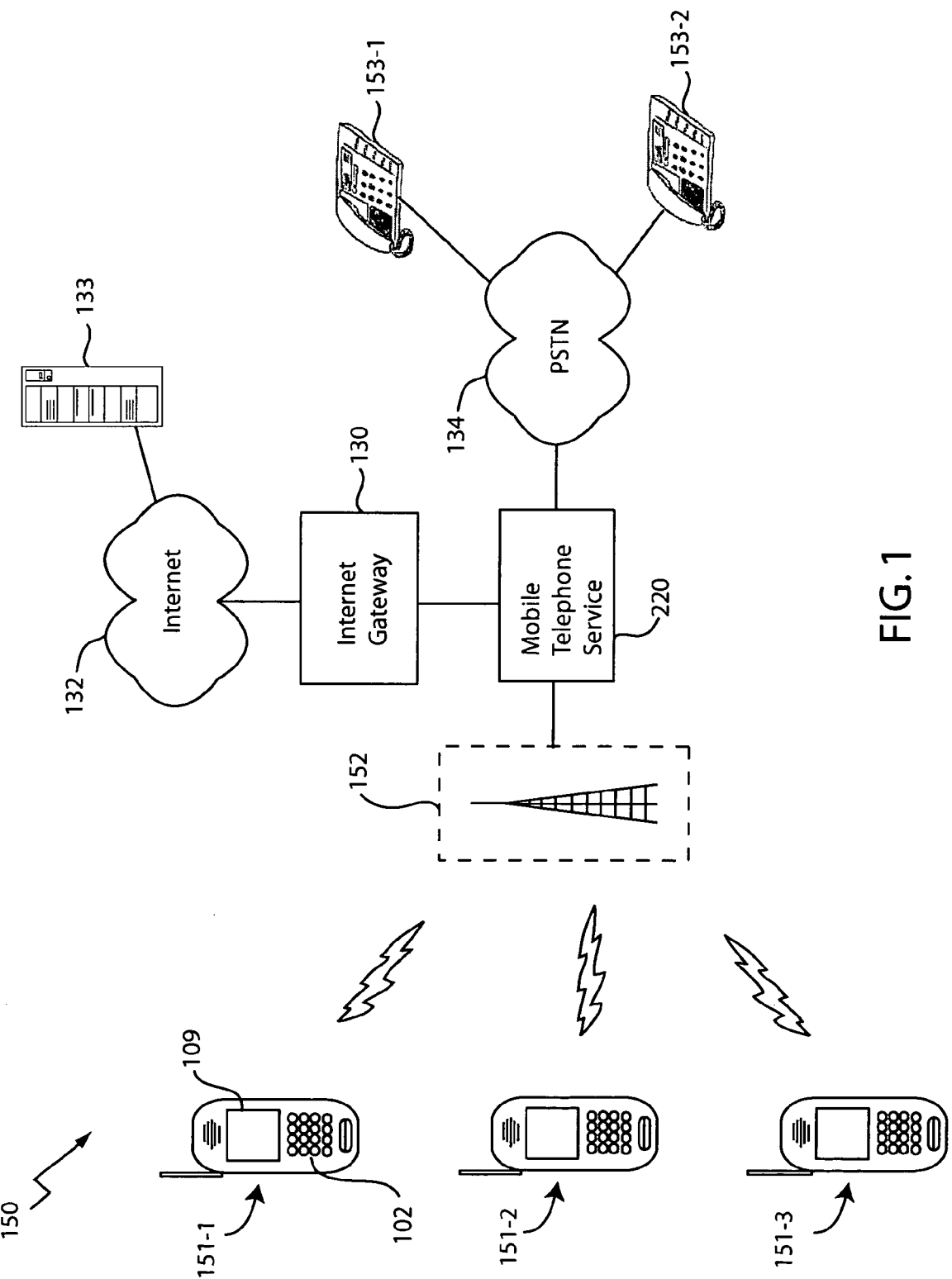
FIG. 1 schematically shows an example communications network where embodiments of the present invention may be employed.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

In light of the present disclosure, persons of ordinary skill in the art will appreciate that the components disclosed herein may be implemented in hardware, software, or a combination of hardware and software (e.g., firmware). Software components may be in the form of computer-readable program code (i.e., computer instructions and data) stored in a computer-readable storage medium, such as volatile or non-volatile memory. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

To perform an antivirus task, antivirus software needs a method to intercept file system activities in real-time. Intercepting file system activities for antivirus tasks in a traditional (i.e. non-embedded) operating system is well known. For Win32 platforms, such as the Microsoft Windows NT™ operating system for personal computers, a File System Driver (FSD) filter may be employed to monitor and intercept file system activities. The FSD filter is a special type of kernel driver on Win32 platforms. It registers itself to the kernel file system manager and acts as a filter layer at the layered file system drivers. It intercepts IRP (also referred to as "IO request packets") requests and catches IRP_MJ_CREATE, IRP_MJ_READ, IRP_MJ_WRITE and IRP_MJ_CLOSE dispatches and FASTIO routines to allow for invocation of antivirus scanning tasks. Such technique, however, is totally unsuitable in resource constrained, embedded environments. For example, the Windows Mobile™ platform uses a different file system driver model and does not provide IRP mechanisms.

Although the Windows Mobile™ platform provides another FSD filter driver, it has two major limitations. Firstly, it is expected that a FSD filter driver will be loaded during initialization of a file system if the filter driver is registered in the registry. If the FSD filter driver itself is stored in that file system, however, the loading of the filter driver will not succeed unless the file system is already initialized in the first place. That's a paradox. Secondly, the registry itself is also stored in a file system, preventing loading of the file driver by the file system. Thus, the FSD filter driver model for Windows Mobile™ platforms should only be used in before-built environments, which means the driver itself must be built into the operating system and will be available at once at system booting time.

There are two other methods that can be used for real time monitoring of file system activities in Windows Mobile™ platforms. One is modification of an import table to coredll.dll. The other utilizes a file system change notification.

Import table modification on Windows Mobile™ platforms involves creating a hooking code as a dynamic link library (DLL). The hooking DLL is registered as an object that will be loaded automatically when the system creates a new process by including the hooking code's name in the value of "HKEY_LOCAL_MACHINE\System\Kernel\InjectDLL". During the loading process, the hooking DLL goes through all the modules already loaded by the host process and modifies file system application programming interface (API) entries in their import table. The hooking DLL also hooks the LoadLibrary and LoadDriver API entries to intercept any further DLL or driver loading attempts to ensure later loaded DLL's will also be hooked. Import table modification patches at the client-side of an API function call. Because an antivirus task may need to intercept all API function calls from any client process and module, each module of each process that may invoke an API may need to be patched.

The import table modification method has several limitations. First, it is relatively inefficient and has a high overhead. Since the hooking DLL is loaded each time a new process is created and hooking API entries is a complex task (function import relationships between DLL's have a tree structure), the import table modification technique significantly increases new process creation time. Second, hooking DLL can't be injected to filesys.exe and nk.exe by registry key "InjectDll" because of the initialization sequence of the kernel and file system. That is, the import table modification technique can't be used to monitor or intercept file system activities originating from these two processes. Third, there are stability issues because the hooking DLL loading and initialization jobs are relatively complex. Fourth, DLL's injected by "InjectDll" registry key cannot be readily unloaded. This prevents software using such DLL to update itself unless the operating system is rebooted twice, creating major difficulty for users (and making the software less commercially appealing).

The file system change notification method on the Windows Mobile™ platform involves registering to receive notification of system events that make changes to the file system. In this method, a system activity monitoring application runs as a separate process. It is registered as an event sink to file system changes. While a file is being changed, the monitoring application will receive a notification message so that the application can perform additional processing. The monitoring application is just a file change monitor, not a real time system activity monitor and interceptor. Therefore, it cannot intercept execution requests to infected objects already in the file system. Because of this, the file system change notification method cannot fully satisfy the requirements of real time anti-virus products.

Referring now to FIG. 1, there is schematically shown an example communications network 150 where embodiments of the present invention may be employed. In the example of FIG. 1, the network 150 is a telephone network that includes mobile telephones 151 (i.e., 151-1, 151-2, . . . ), a wireless communications infrastructure 152, and a mobile telephone service center 220. In one embodiment, a mobile telephone 151 is a smart phone having an input device 102 (e.g., a keypad) and a display screen 109. The mobile telephones 151 are running an embedded operating system, which in one embodiment is the Microsoft Windows Mobile™ platform. Embedded operating systems are well known in the art and typically used in embedded, specialized applications with limited resources. Embedded operating systems are designed to be very compact and efficient, forsaking many functionalities that non-embedded computer operating systems provide and which may not be used by the specialized applications they run. Embedded operating systems are frequently also real-time operating systems. Other examples of well known embedded operating systems include the Symbian™ and the QNX™ operating systems.

The mobile telephones 151 may wirelessly communicate with each other or other devices by way of the wireless infrastructure 152 operated by the mobile telephone service center 220. The mobile telephone service center 220 may connect a mobile telephone 151 to other telephone networks including the Public Switched Telephone Network (PSTN) 134. The mobile telephone service center 220 may also be coupled to an Internet gateway 130 to connect the mobile telephones 151 to a public computer network 132, which in the example of FIG. 1 is the Internet. The mobile telephone service center 220 thus allows the mobile telephones 151 to communicate with telephones 153 (i.e. 153-1, 153-2, . . . ) over the PSTN 134 and with one or more computers 133 (e.g. a website) over the Internet. For example, a mobile telephone 151 may receive a file from a computer 133 or another smart phone. The mechanisms for connecting a smart phone to other devices on a telephone or computer network, in general, are well known and not further described here.

In one embodiment, a mobile telephone 151 running an embedded operating system includes antivirus software for protection against computer viruses. When a file-related operation is initiated in the mobile telephone 151, the antivirus software performs its antivirus task prior to allowing the file-related operation to proceed to completion. In one embodiment, the antivirus software intercepts a function call to a function code for a file-related operation, such as reading of a file received over the Internet. The function call is redirected to an antivirus function code of the antivirus software, which may scan the file for viruses. The antivirus function code may forward the function call to the original function code (i.e. the function code supposedly invoked by the function call) after the file has been checked for viruses. The technique of redirecting a function call from a function code to an antivirus function code is also referred to herein as "hooking." For example, embodiments of the present invention may be implemented in a hooking code described later on below.

Figure 2:
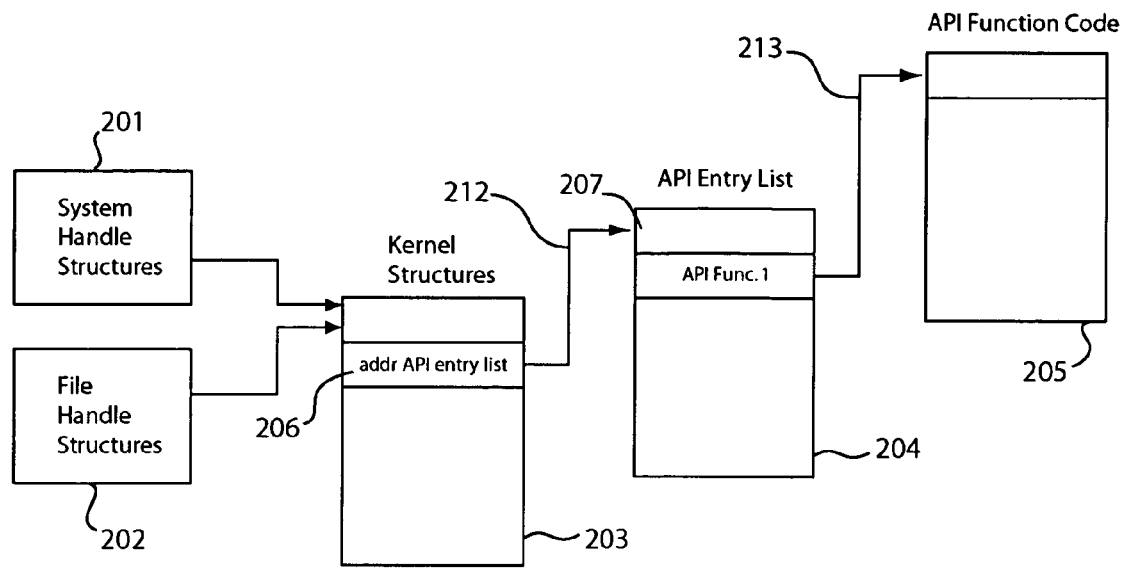
FIG. 2 schematically illustrates how an application programming interface (API) function code may receive a function call before a kernel structure is modified to allow redirection to an antivirus function code.

In one embodiment, the antivirus software intercepts a function call to the original function code using a technique now described with reference to FIGS. 2 and 3. FIG. 2 schematically illustrates how an application programming interface (API) function code 205 may receive a function call before the kernel structure 203 is modified to allow redirection to an antivirus function code. In the example of FIG. 2, a kernel structure 203 is referenced by system handle structures 201 and file handle structures 202. Both of these handle structures are implied by file handles. For different file handles, there are different handle structure instances. However, there is only one instance of a kernel structure 203 for every type of handles, e.g. for file handle type. This makes the present hooking code solution very flexible and isolated from application processes. As its name implies, the instances of kernel structure 203 are part of the kernel, which is the central module of the embedded operating system. On the Windows Mobile™ platform, the kernel structure 203 is referred to as the "CINFO" structure.

The kernel structure 203 includes a reference to an API entry list 204. The reference to the API entry list 204 may be a pointer 206 to an address of an entry point 207 of the API entry list 204. The API entry list 204 comprises a listing of the API function codes supported by the embedded operating system. For example, the API entry list 204 has a reference to the entry point of the API function code 205. The API function code 205 may comprise computer-readable program code for a file operation, such as reading or writing of a file. When a function call to the API function code 205 is made (e.g. by an application or driver), the API function code 205 receives the function call by way of the link from the kernel structure 203 to the API entry list 204 (see arrow 212) and from the API entry list 204 to the API function code 205 (see arrow 213).

Figure 3:
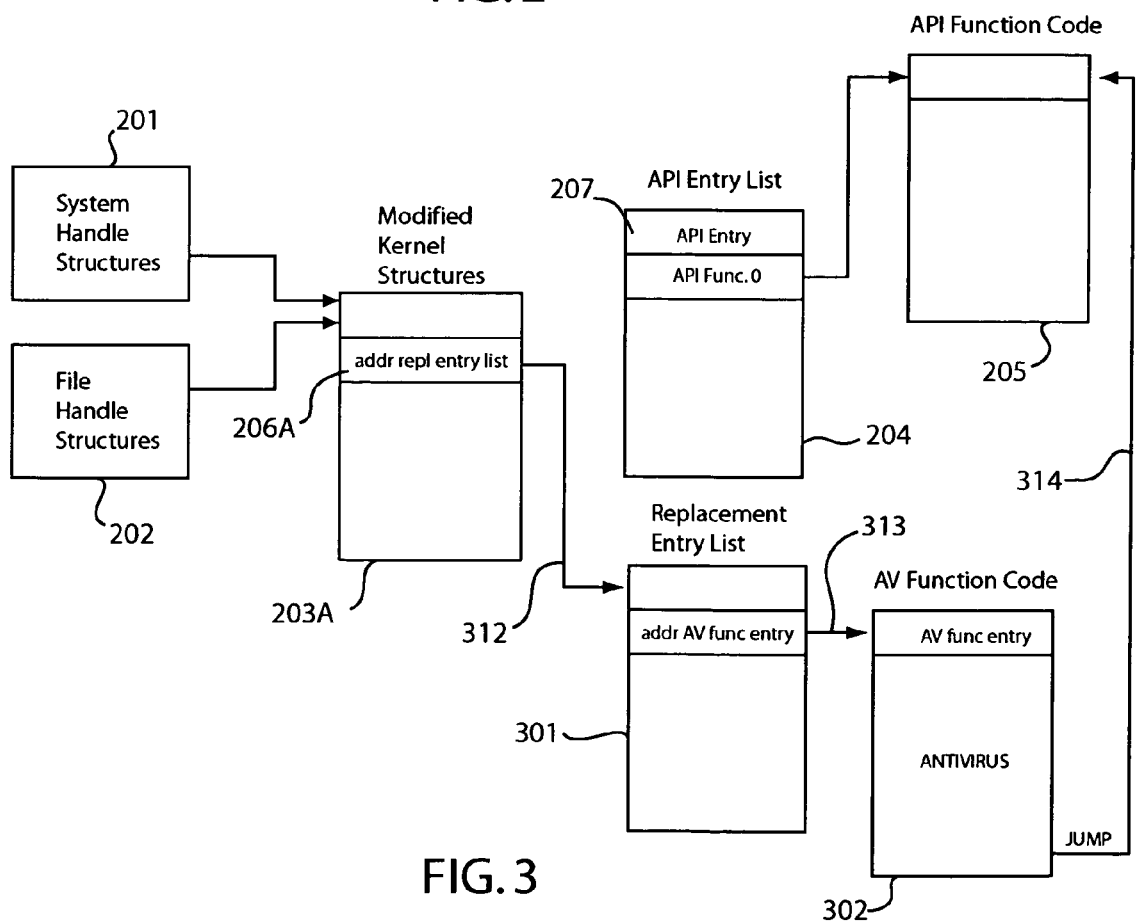
FIG. 3 schematically shows a kernel structure after it has been modified to allow redirection to an antivirus function code in accordance with an embodiment of the present invention.

FIG. 3 schematically shows the kernel structure 203 after it has been modified to allow redirection to an antivirus function code in accordance with an embodiment of the present invention. The kernel structure 203 has been relabeled as "203A" to indicate that it has been modified. In the example of FIG. 3, the kernel structure 203A has been modified such that the reference to the API entry list 204 (see 206 in FIG. 2) has been replaced with a reference to a replacement entry list 301 (see 206A in FIG. 3). For example, a pointer 206A to the address of an entry point of the replacement entry list 301 may be written over the pointer 206 (see FIG. 2) to the address of the entry point of the API entry list 204 in the unmodified kernel structure 203. The replacement entry list 301 may include a reference (e.g. an address pointer) to an antivirus function code 302. In one embodiment, the antivirus function code 302 comprises computer-readable program code for scanning files for computer viruses. The antivirus function code 302 may have a reference, such as jump instruction, to the API function code 205 to allow the API function code 205 to be executed after the antivirus function code 302 has performed its antivirus task. The antivirus function code 302 may also be configured to prevent the API function code 205 from executing in the event the antivirus function code 302 finds a virus during scanning. It is to be noted that the mechanics of scanning a file for viruses, in general, is well known in the art and not further described here.

Still referring to FIG. 3, the API function code 205 may be invoked by following the link from the kernel structure 203A to the replacement entry list 301 (see arrow 312), from the replacement entry list 301 to the antivirus function code 302 (see arrow 313), and from the antivirus function code 302 to the API function code 205 (see arrow 314). Program execution in the API function code 205 proceeds in the same manner as if the antivirus function code 302 has not performed the antivirus task. Advantageously, the above-described technique allows function calls to the API function code 205 to be transparently redirected to the antivirus function code 302 prior to or after allowing the API function code 205 to execute. This enables performance of antivirus task using the antivirus function code 302 before or after a file operation is executed by the API function code 205. For example, assuming the API function code 205 is for reading a file in the mobile telephone 151, the antivirus function code 302 may scan that file for viruses before allowing it to be read. In the event the file has a virus, the antivirus function code may prevent execution of the API function code 205 to prevent the virus from spreading in the mobile telephone 151.

Modifying the kernel structure 203 instead of non-kernel structures, such as import address tables, allows for a relatively efficient modification. The kernel structure 203 is part of the kernel and is on the server side of the embedded operating system. That is, the kernel structure 203 is shared by all client processes and modules. Modifying an entry in the kernel structure 203 as shown in FIG. 3 advantageously allows all subsequent API function calls to be redirected to the antivirus function code 302.

The number of API function calls that can be hooked for redirection to an antivirus function code may vary depending on the operating system. Using the Windows Mobile™ platform as an example, Table 1 shows the API functions that can be hooked in the APIset "W32A" served by the Protected Server Library (PSL) "filesys.exe", while Table 2 shows the API functions that can be hooked in the APIset "HFSD" and "W32H" related to file handles.

TABLE 1

| API name | Function index |
|---|---|
| ProcNotify | 0 |
| N/A | 1 |
| CreateDirectoryW | 2 |
| RemoveDirectoryW | 3 |
| MoveFileW | 4 |
| CopyFileW | 5 |
| DeleteFileW | 6 |
| GetFileAttributes | 7 |
| FindFirstFileW | 8 |
| CreateFileW | 9 |
| CeRegisterFileSystemNotification | 10 |
| CeRegisterReplNotification | 11 |
| CeOidGetInfoEx2 | 12 |
| CeFindFirstDatabaseEx | 13 |
| CeCreateDatabaseEx2 | 14 |

TABLE 1-continued

| API name | Function index |
|---|---|
| CeSetDatabaseInfoEx2 | 15 |
| CeOpenDatabaseEx2 | 16 |
| RegCloseKey | 17 |
| RegCreateKeyExW | 18 |
| RegDeleteKeyW | 19 |
| RegDeleteValueW | 20 |
| RegEnumValueW | 21 |
| RegEnumKeyExW | 22 |
| RegOpenKeyExW | 23 |
| RegQueryInfoKeyW | 24 |
| RegQueryValueExW | 25 |
| RegSetValueExW | 26 |
| CreateContainerW | 27 |
| CeDeleteDatabaseEx | 28 |
| RegisterDevice | 29 |
| DeregisterDevice | 30 |
| SetFileAttributesW | 31 |
| GetStoreInformation | 32 |
| CeGetReplChangeMask | 33 |
| CeSetReplChangeMask | 34 |
| CeGetReplChangeBits | 35 |
| CeClearReplChangeBits | 36 |
| CeGetReplOtherBits | 37 |
| CeSetReplOtherBits", | 38 |
| GetSystemMemoryDivision | 39 |
| SetSystemMemoryDivision | 40 |
| RegCopyFile | 41 |
| CloseAllFileHandles | 42 |
| DeleteAndRenameFile | 43 |
| RegRestoreFile | 44 |
| RegisterAFSEx | 45 |
| DeregisterAFS | 46 |
| GetPasswordActive | 47 |
| SetPasswordActive | 48 |
| RegFlushKey | 49 |
| FileSystemPowerFunction | 50 |
| CeSetReplChangeBitsEx | 51 |
| RegisterAFSName | 52 |
| DeregisterAFSName | 53 |
| GetDiskFreeSpaceExW | 54 |
| IsSystemFile | 55 |
| CeChangeDatabaseLCID | 56 |
| DumpFileSystemHeap | 57 |
| CeMountDBVol | 58 |
| CeEnumDBVolumes | 59 |
| CeUnmountDBVol | 60 |
| CeFlushDBVol | 61 |
| CeFreeNotification | 62 |
| FindFirstFileExW | 63 |
| RegSaveKey | 64 |
| RegReplaceKey | 65 |
| SignalStarted | 66 |
| SetCurrentUser | 67 |
| SetUserData | 68 |

TABLE 1-continued

| API name | Function index |
|---|---|
| GetUserInformation | 69 |
| SetPasswordStatus | 70 |
| GetPasswordStatus | 71 |
| ReplOpenSync | 72 |
| ReplCheckpoint | 73 |
| ReplCloseSync | 74 |
| ReplGetSyncState | 75 |
| ReplChangeSyncSettings | 76 |
| ReplFindNextChange | 77 |
| ReplGetOidStatus | 78 |
| CreateMsgQueue | 79 |
| OpenMsgQueue | 80 |
| ReadMsgQueue | 81 |
| WriteMsgQueue | 82 |
| GetMsgQueueInfo | 83 |
| CloseMsgQueue | 84 |
| CryptProtectData | 85 |
| CryptUnprotectData | 86 |
| GenRandom | 87 |
| FindFirstChangeNotificationW | 88 |
| FindNextChangeNotification | 89 |
| FindCloseChangeNotification | 90 |
| CeGetFileNotificationInfo | 91 |

TABLE 2

| API name | Function index |
|---|---|
| CloseFileHandle | 0 |
| N/A | 1 |
| ReadFile | 2 |
| WriteFile | 3 |
| GetFileSize | 4 |
| SetFilePointer | 5 |
| GetFileInformationByHandle | 6 |
| FlushFileBuffers | 7 |
| GetFileTime | 8 |
| SetFileTime | 9 |
| SetEndOfFile | 10 |
| DeviceIoControl | 11 |
| ReadFileWithSeek | 12 |
| WriteFileWithSeek | 13 |

Macros may be created to expedite implementation of a hooking code incorporating the redirection/hooking logic described in connection with FIGS. 2 and 3. Table 3 provides example macros for hooking the file system API functions CreateFileW (see Table 1) and WriteFile (see Table 2).

TABLE 3

```
HOOK_DEF(HANDLE,WINAPI,CreateFileW,  (LPCTSTR   lpFileName,  DWORD  dwDesiredAccess,  DWORD  dwShareMode,
    LPSECURITY_ATTRIBUTES lpSecurityAttributes, DWORD dwCreationDispostion, DWORD dwFlagsAndAttributes, HANDLE
    hTemplateFile))
HOOK_DEF(BOOL,WINAPI,HFSD_WriteFile,  (PVOID   hFile,   LPCVOID   lpBuffer,  DWORD  nNumberOfBytesToWrite,  LPDWORD
    lpNumberOfBytesWritten, LPOVERLAPPED lpOverlapped))
HOOK_DEF(BOOL,WINAPI,W32H_WriteFile,  (PVOID   hFile,   LPCVOID   lpBuffer,  DWORD  nNumberOfBytesToWrite,  LPDWORD
    lpNumberOfBytesWritten, LPOVERLAPPED lpOverlapped))
HOOK_BEGIN
HOOK_W32A_FUNC(9,CreateFileW)
HOOK_HFSD_FUNC(3,HFSD_WriteFile)
HOOK_W32H_FUNC(3,W32H_WriteFile)
HOOK_END
HANDLE  WINAPI  hook_CreateFileW(LPCTSTR  lpFileName,  DWORD  dwDesiredAccess,  DWORD  dwShareMode,
    LPSECURITY_ATTRIBUTES lpSecurityAttributes, DWORD dwCreationDispostion, DWORD dwFlagsAndAttributes, HANDLE
    hTemplateFile)
{
  // customizable processing logic, e.g. scan the file for virus, etc.
  // . . .
  HANDLE
  hRet=old_CreateFileW(lpFileName,dwDesiredAccess,dwShareMode,lpSecurityAttributes,dwCreationDispostion,dwFlagsAndAttributes,0 );
  // customizable processing logic
  // . . .
  return hRet;
}
BOOL  WINAPI  hook_HFSD_WriteFile ( PVOID pvObj, LPCVOID lpBuffer, DWORD nNumberOfBytesToWrite, LPDWORD
    lpNumberOfBytesWritten, LPOVERLAPPED lpOverlapped)
{
  // customizable processing logic
  // . . .
  BOOL bRet=old_HFSD_WriteFile(pvObj,lpBuffer,nNumberOfBytesToWrite,lpNumberOfBytesWritten,NULL);
  // customizable processing logic, e.g. scan the file for virus, etc.
  // . . .
  return bRet;
}
BOOL  WINAPI  hook_W32H_WriteFile  ( PVOID  pvObj,  LPCVOID  lpBuffer,  DWORD  nNumberOfBytesToWrite,  LPDWORD
    lpNumberOfBytesWritten, LPOVERLAPPED lpOverlapped)
{
  // customizable processing logic
  // . . .
  BOOL bRet=old_W32H_WriteFile(pvObj,lpBuffer,nNumberOfBytesToWrite,lpNumberOfBytesWritten,NULL);
  // customizable processing logic, e.g. scan the file for virus, etc.
  // . . .
  return bRet;
}
```

In the example of Table 3, the "HOOK_DEF( )" macro is for hook function and stub function prototype declaration. Given a function return type, calling convention, function name and function parameter list, HOOK_DEF( ) would declare function prototypes for hook_XXXXX and old_XXXXX where XXXXX represents the function name. The hook_XXXXX function is the new API entry while old_XXXXX is the original API entry. The "HOOK_W32A_FUNC( )" macro is used to define a hook entry for the APIset "W32A" (see Table 1), while the "HOOK_HFSD( )" and "HOOK_W32H" macros are used to define a hook entry for the APIset "HFSD" and "W32H" (see Table 2). Given an API function index and API function name, the API entry will be replaced with the hook_XXXXX function. All of the macros will take effect at the hooking code initialization/deinitialization phase to hook/unhook the API functions.

To provide the most flexibility, the hooking code is advantageously configured to be injected into the PSL's context at any given time, such as during boot time, as soon as the user activates a feature, after a software update, and so on. This may be achieved using a remote dynamic link library (DLL) loading technique. In one embodiment, the hooking code for redirecting a function call to an antivirus function code is implemented as a DLL. The hooking code DLL is injected to the process address space of the PSL serving the APIset that is going to be hooked. For hooking of file system API functions on the Windows Mobile™ platform, the object PSL process is filesys.exe. Immediately below is an example pseudo code for injecting the hooking code DLL into the PSL's context.

Get entry address of LoadLibrary/LoadDriver functions at target process address space.

Prepare parameters for LoadLibrary/LoadDriver functions for the target process address space.

Migrate current thread to target process.

Jump to entry of LoadLibrary/LoadDriver functions and load the hooking code into target process address space.

Migrate current thread back to owner process.

During the execution of LoadLibrary/LoadDriver functions, the initialization routine of the hooking code may be invoked to get all required API functions hooked for redirection to the antivirus function code.

To avoid having to reboot the operating system during a software update, the injected hooking code should be capable of being dynamically unloaded from the PSL's process address space at any time. This may be achieved on the Windows Mobile™ platform using the same process for injecting codes into a PSL's address space except that GetModuleHandle and FreeLibrary functions are used instead of LoadLibrary/LoadDriver functions. During execution of the FreeLibrary function, the deinitialization routine of the hooking code may be invoked to get all hooked API functions restored.

There is a possible racing condition during the restoration process of the API functions and unloading of the hooking code. If any thread running into the hooking code or original API function code returns at a time when the hooking code already unloaded, the CPU (central processing unit) control will be transferred to an address without legal instructions. That will result in a severe system error that could crash the operating system. To avoid this problem, an aggressive unhook and lazy unload algorithm may be employed. In one embodiment, a global counter is used to keep track of the number of threads calling into the hooking code. In each hook_XXXXX function, the global counter is increased at entering time and decreased at leaving time. In the deinitialization routine of the hooking code, API entry or instruction restoration jobs are performed immediately to ensure no more threads can run into the hooking code. Then, the hooking code is unloaded from memory after waiting for the global counter to decrease to zero.

Figure 4:
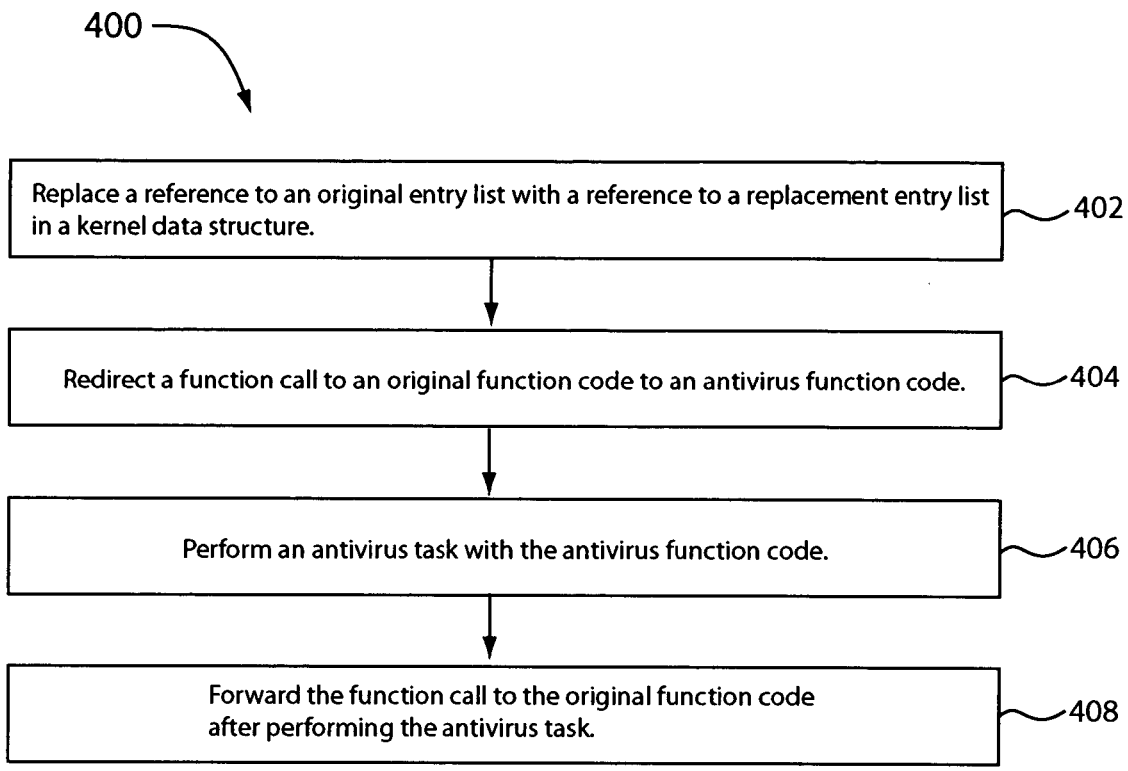
FIG. 4 shows a flow diagram of a method of performing an antivirus task in a mobile wireless device running an embedded operating system in accordance with an embodiment of the present invention.

Referring now to FIG. 4, there is shown a flow diagram of a method 400 of performing an antivirus task in a mobile wireless device running an embedded operating system in accordance with an embodiment of the present invention. In step 402, a reference to an original entry list is replaced with a reference to a replacement entry list in a kernel structure of the embedded operating system. The replacement entry list includes a reference to an antivirus function code. In step 404, a function call to an original function code is redirected to the antivirus function code. A reference to the original function code may have been included in the original entry list, which has since been replaced with the replacement entry list. The replacement entry list may include a reference to the antivirus function code such that the function call to the original function code is redirected to the antivirus function code by way of the replacement entry list. In step 406, an antivirus task is performed with the antivirus function code. The antivirus task may comprise scanning and cleaning one or more files in the mobile wireless device for computer viruses. In step 408, the function call is forwarded to the original function code after the antivirus task has been performed. This allows the function call to the original function to proceed assuming no viruses were found or virus disinfected by the antivirus task. For example, the function call to the original function code may be for opening a file stored in the mobile wireless device. By transparently performing the antivirus task before allowing the function call to proceed, the antivirus task may check the file for viruses before the original function code opens or allows opening of the file. It is to be noted that antivirus logics can also be invoked after an API call is executed. For example, after CloseHandle is finished, antivirus code may be invoked to ensure the modified file is not infected.

Figure 8:
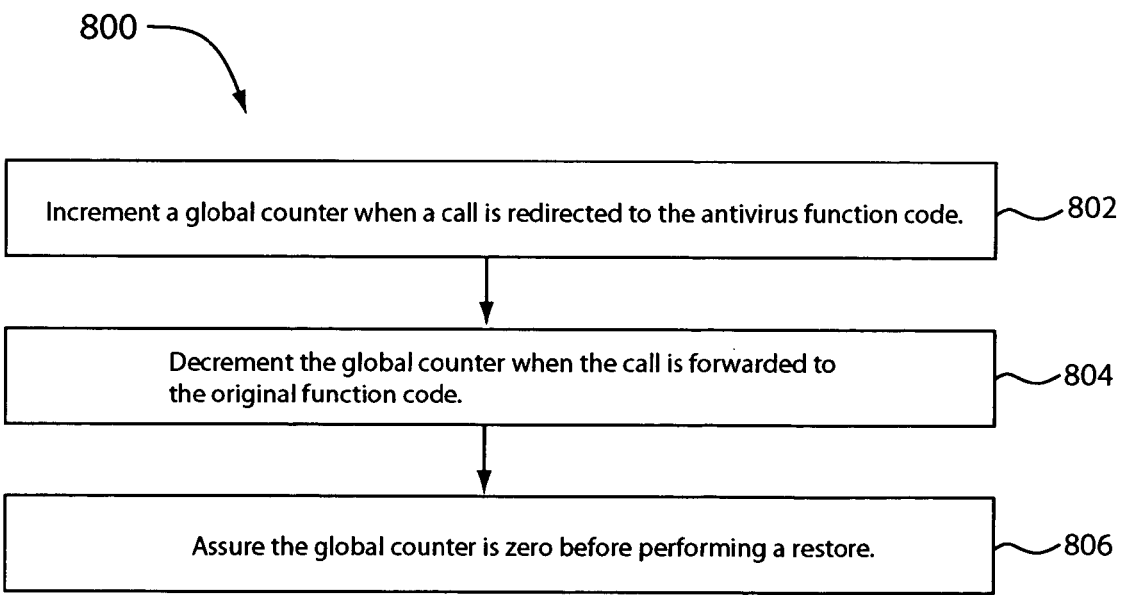
FIG. 8 shows a flow diagram of a method of restoring a modified kernel structure or modified function code in accordance with an embodiment of the present invention.

FIG. 8 shows a flow diagram of a method 800 of restoring a modified kernel structure or modified function code in accordance with an embodiment of the present invention. The method 800 may be employed to restore the kernel structure 203A of FIG. 3 to its original form (i.e. kernel structure 203 shown in FIG. 2). As will be more apparent below, the method 800 may also be used to restore a modified function code 502A (see FIG. 6) to its original form. In step 802, a global counter is incremented whenever a function call is redirected to an antivirus function code. A global counter is preferred over a local counter to allow counting of redirected calls to more than one antivirus function codes. In step 804, the global counter is decremented whenever an antivirus function code has executed and the call is forwarded to an original function code intended to receive the call in the first place. In step 806, a modified kernel structure or modified function code is restored to its original form only after assuring that the global counter has counted to zero. By incrementing the global counter for each redirection to an antivirus function code and decrementing the global counter after execution of the antivirus function code, the number of redirection that has yet to complete may be tracked. This advantageously prevents a modified kernel structure or modified function code from being restored prior to completion of the redirection.

Figure 5:
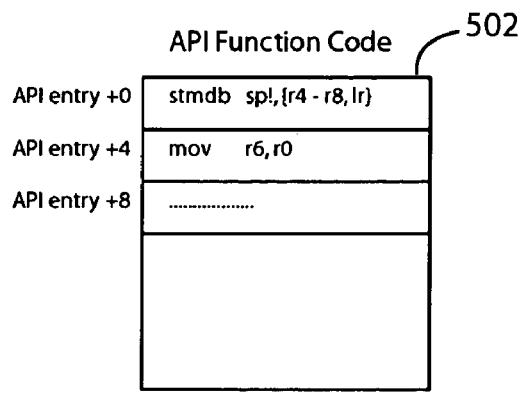
FIG. 5 schematically illustrates an example of a function code before being modified to allow redirection to an antivirus function code.
Figure 6:
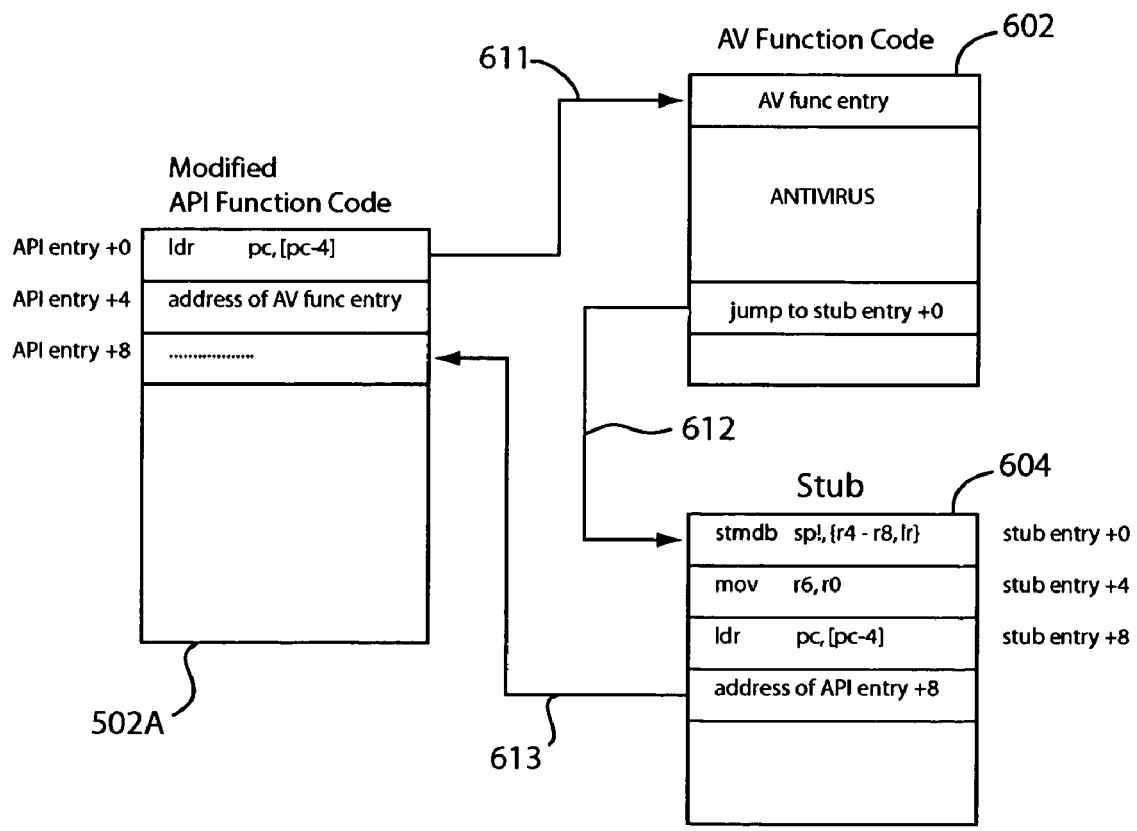
FIG. 6 schematically illustrates how a function call to a function code may be redirected to an antivirus function code in accordance with an embodiment of the present invention.

Another technique for allowing antivirus software to intercept a function call to an original function code is now described with reference to FIGS. 5 and 6. FIG. 5 schematically illustrates a function code 502 before being modified to allow redirection to an antivirus function code. In one embodiment, the function code 502 comprises an API function code of an embedded operating system running in a mobile wireless device. In the example of FIG. 5, the function code 502 comprises instructions at memory locations offset from an API entry address (i.e., API entry+0, API entry+2, and so on). FIG. 6 schematically illustrates how a function call to the function code 502 may be redirected to an antivirus function code 602 in accordance with an embodiment of the present invention. In the example of FIG. 6, the function code 502 has been labeled as "502A" to indicate it has been modified. In one embodiment, the function code 502 has been modified such that the its first few instructions have been replaced with a reference to the antivirus function code 602 (see arrow 611). The reference to the antivirus function code 602 may be an instruction to load the address of the entry point of the antivirus function code 602 into the program counter, for example (see instructions in API entry+0 and API entry+4 of function code 502A). Loading of the address of the entry point of the antivirus function code 602 allows execution of the antivirus function code 602 when a function call is made to the function code 502A. After an antivirus task has been performed by the antivirus function code 602, the function call may be forwarded back to the function code 502A. In one embodiment, the function call is forwarded back to the function code 502A by way of a stub code 604. For example, a jump instruction to the entry point (i.e. stub entry+0) of the stub code 604 may be executed after the antivirus function code 602 has performed the antivirus task (see arrow 612). As shown in FIG. 6, the stub code 604 may include the instructions removed from the function code 502 as part of its modification (compare API entry+0 and API entry+4 of the function code 502 in FIG. 5 and the stub entry+0 and stub entry+4 of the stub code 604 in FIG. 6). The removed instructions of the function code 502 may be executed in the stub code 604. Thereafter, program execution may proceed with the next instruction in the function code 502A (see arrow 613) by loading the address of the next instruction (API entry+8 in this example) in the program counter, for example. The above-described modification may be performed for all API function codes that need to be intercepted to perform an antivirus task.

Figure 7:
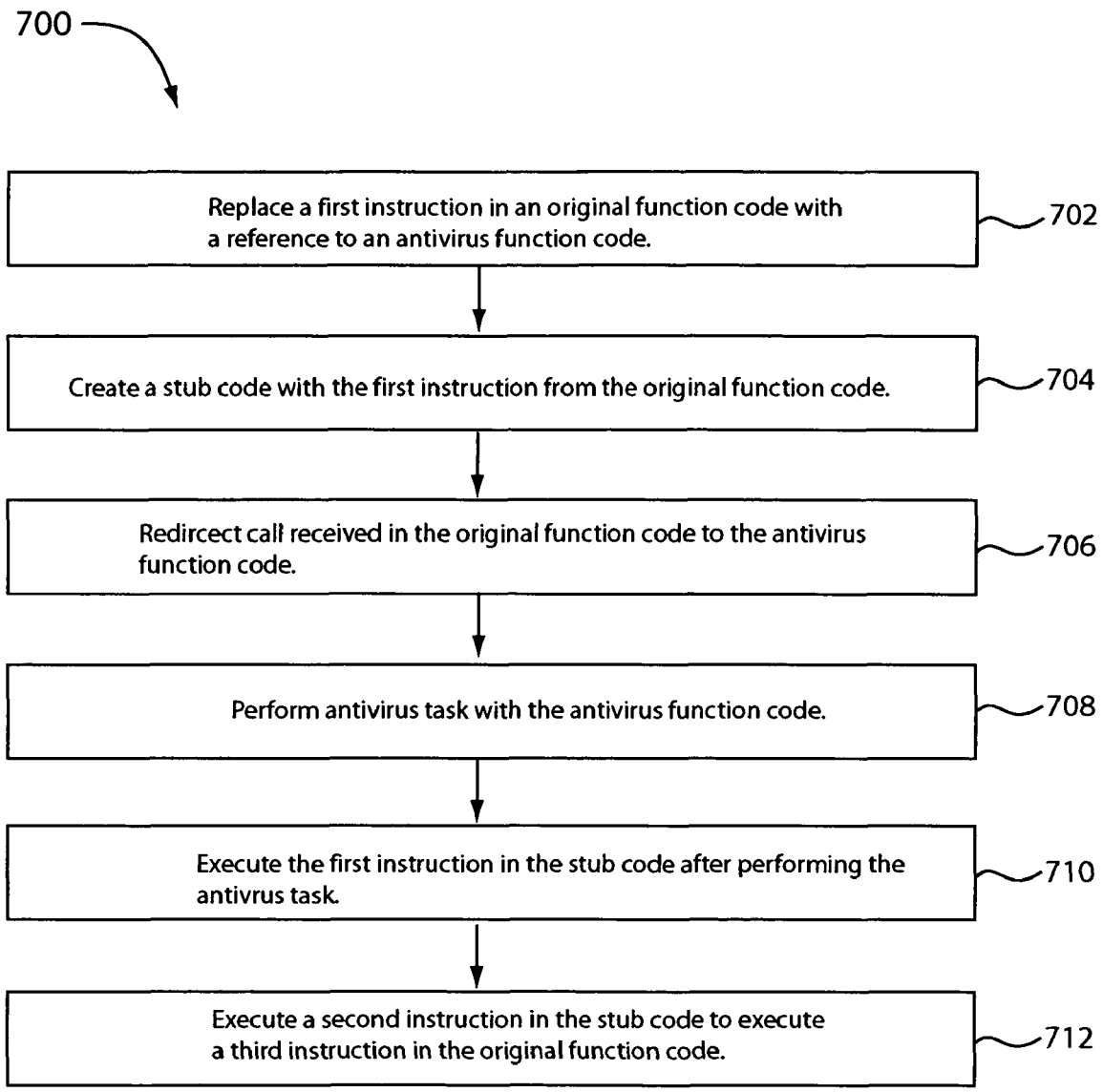
FIG. 7 shows a flow diagram of a method of performing an antivirus task in a mobile wireless device running an embedded operating system in accordance with an embodiment of the present invention.

FIG. 7 shows a flow diagram of a method 700 of performing an antivirus task in a mobile wireless device running an embedded operating system in accordance with an embodiment of the present invention. In step 702, a first instruction in an original function code is replaced with a reference to an antivirus function code. The original function code may comprise an API function code. The reference to the antivirus function code may comprise an instruction to load a program counter of a central processing unit (CPU) of the mobile wireless device with an address of an entry point of the antivirus function code, for example. In step 704, a stub code is created. The stub code may include one or more instructions that have been replaced in the original function code as part of step 702. In step 706, a function call received in the original function code is redirected to the antivirus function code. Step 706 may be performed by following the reference to the antivirus function code. In step 708, an antivirus task is performed with the antivirus function code. Step 708 may be performed by executing an antivirus scanning code in the antivirus function code, for example. In step 710, the first instruction replaced in the original function code is executed in the stub code after performing the antivirus task. In step 712, a second instruction in the stub code is executed to allow execution of a third instruction in the original function code. In one embodiment, the second instruction comprises loading the program counter with the address of a memory location containing the third instruction. The third instruction may comprise a next instruction in the original function code following the reference to the antivirus function code.

The original function code may be restored to its previous form (i.e. before step 702) after assuring that each call redirected to the antivirus function code has exited the antivirus function code. The original function code may be restored to its previous form by employing a global counter to keep track of redirections to the antivirus function code as in method 800 (see FIG. 8).

Figure 9:
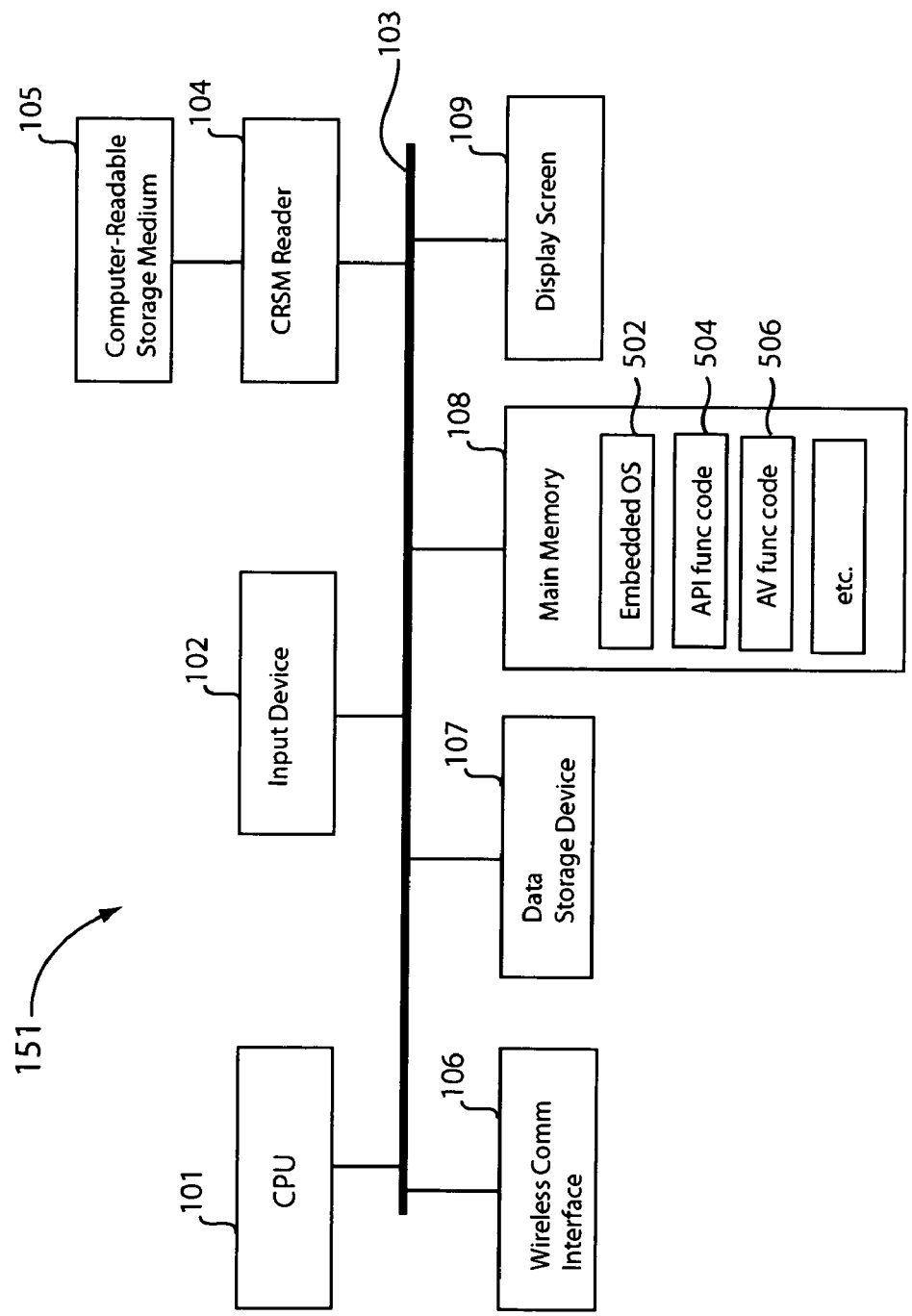
FIG. 9 schematically shows a mobile telephone in accordance with an embodiment of the present invention.

Referring now to FIG. 9, there is schematically shown a mobile telephone 151 in accordance with an embodiment of the present invention. The mobile telephone 151 of FIG. 9 may have less or more components to meet the needs of a particular application. As shown in FIG. 9, the mobile telephone 151 may include a central processing unit 101. The mobile telephone 151 may have one or more buses 103 coupling its various components. The mobile telephone 151 may include one or more input devices 102 (e.g., keypad), a computer-readable storage medium (CRSM) 105 (e.g., flash card), a CRSM reader 104 (e.g., flash card reader), a display screen 109 (e.g., LCD display), a wireless communications interface 106 for coupling to a wireless network, one or more data storage devices 107 (e.g., non-volatile memory), and a main memory 108 (e.g., RAM). Software embodiments may be stored in the computer-readable storage medium 105 for reading into the data storage device 107 or the main memory 108. Software embodiments may also be received by way of the wireless communications interface 106.

In the example of FIG. 9, the mobile telephone 151 has been configured to perform an antivirus task by redirecting function calls intended for an API function code 504 to an antivirus function code 506, as in the embodiments described above. The main memory 108 may also include the embedded operating system 502. Components in the main memory 108 may be executed by the central processing unit 101.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing an antivirus task in a mobile wireless device, the method comprising:
    replacing a reference to an original entry list with a reference to a replacement entry list in a kernel data structure of an embedded operating system running in the mobile wireless device, the replacement entry list including a reference to an antivirus function code;
    redirecting a call to an original function code to the antivirus function code by way of the replacement entry list;
    performing an antivirus task with the antivirus function code;
    forwarding the call to the original function code after performing the antivirus task;
    restoring the reference to the original entry list in the kernel after assuring that each call redirected to the antivirus function code has exited the antivirus function code;
    wherein assuring that each call redirected to the antivirus function code has exited the antivirus function code comprises incrementing a counter when a call is redirected to the antivirus function code, decrementing the counter when the call is forwarded to the original function code, and assuring the counter is zero before restoring the reference to the original entry list.

2. The method of claim 1 wherein the mobile wireless device comprises a mobile telephone.

3. The method of claim 1 wherein the call comprises function call for a file operation.

4. The method of claim 1 wherein the reference to the antivirus function code comprises a pointer to an entry point of the antivirus function code.

5. The method of claim 1 wherein the antivirus task includes scanning a file in the mobile wireless device for viruses.

6. The method of claim 1 wherein forwarding the call to the original function code after performing the antivirus task comprises performing a jump from the antivirus function code to an entry point of the original function code.

7. The method of claim 6 wherein the entry point of the original function code is referenced in the original entry list.

8. A method of performing an antivirus task in a mobile wireless device, the method comprising:
    replacing a first instruction in an original function code with a reference to an antivirus function code in a mobile wireless device running an embedded operating system;
    creating a stub code comprising the first instruction from the original function code;
    redirecting a call received by the original function code to the antivirus function code by way of the reference to the antivirus function code;
    performing an antivirus task with the antivirus function code;
    executing the first instruction in the stub code after performing the antivirus task;
    executing a second instruction in the stub code to execute a third instruction in the original function code;
    restoring the original function code to its previous form prior to replacing the first instruction in the original function code after assuring that each call redirected to the antivirus function code has exited the antivirus function code;
    wherein assuring that each call redirected to the antivirus function code has exited the antivirus function code comprises incrementing a counter when a call is redirected to the antivirus function code, decrementing the counter when the call is forwarded to the original function code; and assuring the counter is zero before restoring the original function code to its previous form.

9. The method of claim 8 wherein the reference to the antivirus function code in the original function code comprises an instruction loading an address of the antivirus function code in a program counter.

10. The method of claim 8 wherein the mobile wireless device comprises a mobile telephone.

11. The method of claim 8 wherein the antivirus task comprises scanning for viruses.

* * * * *